US006824471B2

(12) United States Patent
Kamenov (10) Patent No.: US 6,824,471 B2
(45) Date of Patent: Nov. 30, 2004

(54) MOTOR AND PUMP SHAFT CONNECTING ASSEMBLY WITH SHAFT LOCATING JACK RING (75) Inventor: Aleksandar Kamenov, Toronto (CA)

(73) Assignee: S. A. Armstrong Limited, Toronto (CA)

(*) Notice: Subject to any disclaimer, the term of this patent is extended or adjusted under 35 U.S.C. 154(b) by 8 days.

(21) Appl. No.: 10/235,651

(22) Filed: Sep. 6, 2002

(65) Prior Publication Data

US 2004/0048675 A1 Mar. 11, 2004

(51) Int. Cl.[7] ............................................. F16D 1/076
(52) U.S. Cl. ..................... 464/182; 403/13; 403/312; 403/344
(58) Field of Search ........................ 464/88, 107, 153, 464/158, 182, 154; 403/13, 16, 310, 312, 313, 195, 199, 332, 341, 344, 354; 384/519

(56) References Cited

U.S. PATENT DOCUMENTS

| 3,838,987 | A | * | 10/1974 | Draut ........................ 29/426.2 |
| 3,851,983 | A | * | 12/1974 | MacKenzie ................ 403/312 |
| 4,422,793 | A | * | 12/1983 | Mandich .................... 403/261 |
| 5,030,018 | A | * | 7/1991 | Korenblit ................... 384/519 |
| 5,208,569 | A | * | 5/1993 | Michelangelo et al. ..... 333/257 |
| 5,287,612 | A | | 2/1994 | Paddock |
| 5,379,519 | A | | 1/1995 | Paddock |

FOREIGN PATENT DOCUMENTS

| GB | 2 153 043 A | 8/1985 |
| GB | 2 223 560 A | 4/1990 |
| WO | WO 01/77562 A2 | 10/2001 |

* cited by examiner

Primary Examiner—David Bagnell
Assistant Examiner—K. Thompson (57) ABSTRACT

A coupling assembly for connecting a drive shaft in axial alignment with a motor shaft includes a coupling sleeve configured to engage an end portion of each of the motor shaft and the drive shaft. The coupling sleeve extends in the axial direction from a forward end proximate to the motor to a distal rearward end which is remote therefrom. A central bore extends through the coupling sleeve and includes a first end portion extending into the forward end of the sleeve having a size complementary to that of the end portion of the motor shaft. A second other end portion of the bore extends axially into the rearward end of the sleeve and has a size which is complementary to that of an end portion of the drive shaft. The sleeve is secured to the motor shaft and a jack or lifting ring is coupled to the drive shaft adjacent to the sleeve. The lifting ring includes an aperture sized to receive therein a connector which is movable into engagement with the coupling sleeve. An internally threaded bore which is spaced radially outwardly from the central bore is provided in the rearward end of the coupling jacket. The aperture is positioned such that the connector is insertable axially into the threaded bore, whereby engagement of the connector with the internal threads moves the lifting ring and drive shaft along the axis relative to the coupling sleeve and motor shaft.

20 Claims, 5 Drawing Sheets

MOTOR AND PUMP SHAFT CONNECTING ASSEMBLY WITH SHAFT LOCATING JACK RING

SCOPE OF THE INVENTION

The present invention relates to a coupling assembly used to connect a rotatable motor shaft to a drive shaft, as for example may be used with a fluid pump, and more particularly a coupling assembly which incorporates a jack ring for moving the drive shaft axially relative to the motor shaft to enable adjustment in its final positioning.

BACKGROUND OF THE INVENTION

Coupling assemblies used to connect a drive shaft in an axially aligned orientation with the end of a rotating motor shaft, so as to be journalled in rotation therewith, are well known. Conventional coupling assemblies typically consist of a two-part sleeve which, in assembly, define a centrally extending bore into which end portions of the motor shaft and drive shaft are located. Screws, pins or other retaining configurations are used to physically couple each of the motor shaft and drive shaft to the sleeve, to thereby mechanically connect the drive shaft to the motor shaft to each other.

With fluid pumps and particularly vertical in-line pumps, the drive shaft typically consists of a pump or impeller shaft to which is connected to a fluid impeller. The impeller is in turn rotatable within a fluid housing to pump the fluid therethrough. It is often desirable to allow for final adjustment of the positioning of the pump shaft axially relative to the motor shaft. In particular, prior to final assembly of vertical in-line pumps, the pump shaft and impeller typically are provided in an initial position resting directly against the bottom of the pump housing. As such, to avoid friction and wear on the pump housing, when connecting the pump shaft to the motor shaft it is desirable to raise the impeller or pump shaft vertically upward, so as to provide a desired degree of clearance between the impeller, the bottom end of the pump shaft and the bottom of the housing.

Heretofore, it has been necessary to manually raise and hold the pump shaft in a position raised relative to the pump housing while the coupling sleeve is secured about both the upper end of the pump shaft and the bottom of the motor shaft. In addition to necessitating extra labour, the inability to manually suspend the pump shaft to a precisely predetermined height during the placement of the coupling sleeve often results in the impeller shaft being positioned either too close or too far from the bottom of the pump housing.

While various individuals have proposed lifting devices to facilitate both the coupling of a motor shaft and a pump or impeller shaft while permitting the impeller shaft to be raised relative thereto, heretofore the prior art lifting devices have achieved limited success as a result of their complex construction and difficulty of use.

SUMMARY OF THE INVENTION

Accordingly, the present invention seeks to provide a simplified construction for a coupling assembly used in connecting a motor shaft and a drive shaft in axial alignment, and which enables simplified adjustment in the final positioning of the drive shaft in the axial direction.

Another object of the invention is to provide a coupling assembly for connecting in axial alignment the ends of a motor shaft and a pump shaft of a vertical in-line pump, and which includes a jack ring for use in raising the pump shaft relative thereto which may be easily and inexpensively manufactured.

Another object of the invention is to provide a coupling assembly used in securing the end of a drive shaft in axial alignment with a motor shaft so as to be rotatable therewith, and which includes a jack or lifting ring formed having two substantially identical ring halves which is adapted to be secured to one of the motor or drive shafts.

Another object of the invention is to provide a simplified method of connecting a drive shaft to a motor shaft using a coupling assembly, and which enables simplified final adjustment in the positioning of the drive shaft axially relative to the motor shaft.

To achieve at least some of the aforementioned objects, the present invention provides for a coupling assembly for use in connecting a drive shaft in axial alignment with a motor shaft, so as to be rotatable therewith. The coupling assembly includes a coupling sleeve or jacket which is configured to engage an end portion of one of the motor shaft and the drive shaft and a jack or lifting ring which is secured to the other. More preferably, the coupling assembly secures the motor shaft and drive shaft in a coupled relationship both aligned with and rotatable about a central axis. Preferably, the coupling sleeve extends in the axial direction from a forward end proximate to the motor to a distal rearward end which is remote therefrom. A central bore extends at least partway into and more preferably through the coupling sleeve. The central bore includes a first end portion which extends into the forward end of the coupling sleeve and has a size which is complementary to that of the end portion of the motor shaft. A second other end portion of the bore extends axially into the rearward end of the sleeve and has a size which is complementary to that of an end portion of the drive shaft.

The sleeve is secured to one of the drive shaft or the motor shaft and the jack or lifting ring is coupled to the other of the drive and motor shafts so as to be movable in assembly to a position adjacent one end of the sleeve. The lifting ring includes an aperture which, by way of non-limiting example, could comprise a bore, slot, or groove which extends in the axial direction. The aperture is sized to receive therein a connector which is insertable axially through the aperture and into engagement with the coupling sleeve, so as to moveably connect the coupling sleeve and lifting ring to each other.

In a simplified construction, an internally threaded bore is spaced radially outwardly from the central bore and extends axially into an adjacent end of the coupling jacket. The connector is insertable axially into the threaded bore in threaded engagement therewith, such that the turning of the connector and its engagement with the internal threads moves the lifting ring and drive shaft along the axis relative to the coupling sleeve.

In a more preferred construction, the connecting assembly is used as part of a water or other fluid pump, and the drive shaft is a pump or impeller shaft which is connected to a fluid impeller which is rotatable within a pump housing. In such a construction, the connecting sleeve is secured to the motor shaft and the jack ring is coupled to the pump shaft with the connecting assembly used to raise both the pump shaft and impeller vertically relative to the pump housing.

The jack or lifting ring may be coupled to the pump shaft in a variety of possible manner, including without restriction by the use of mechanical screws, physical weldments and the like. Most preferably, however, the pump shaft is formed having a reduced diameter slot or groove adjacent to an end portion of the shaft which is insertable into the second end of the central bore of the coupling sleeve, and which is delineated in its axial length by radially extending shoulders. The lifting ring is formed having an internal ring opening with a diameter marginally greater than the radial diameter of the pump shaft at the groove, but less than the diameter of the adjacent portions of the pump shaft. The engagement of the jack ring with the shoulders of the groove thus limits axial sliding of the jack ring relative to the pump shaft securing it thereto. The jack ring may be of a number of possible configurations. Most preferably, the lifting ring is formed having a pair of semi-circular ring segments, each formed with the identical configuration. It is to be appreciated that forming the ring segments with an identical configuration advantageously minimizes manufacturing costs and provides a further simplified construction which facilitates the installation of the coupling assembly.

Like the jack ring, the coupling sleeve may be secured to the motor shaft in a number of possible manner including through the use of mechanical fasteners, weldments and the like. In one preferred construction, a retaining ring or collar having an open interior is slid over the motor shaft. The retaining collar is held in a fixed relationship relative to the motor shaft by a series of screw-type fasteners which are brought into engagement with the motor shaft, securing it thereto in a friction fit. In an alternate construction, the retaining collar may be formed as a split collar and adapted for fitted placement within an annular groove formed in the motor shaft. Such a construction would advantageously permit the retaining collar to be positioned within the annular groove without the use of screws. A radially extending groove is formed about the first end portion of the coupling sleeve and which is open into the central bore. The radial groove has a complementary size to the retaining collar and is located such that the retaining collar is insertable within the groove to prevent axial sliding movement of the coupling jacket relative to the motor shaft.

Although not essential, the pump shaft and/or motor shaft may also include a keyway sized to receive partially therein a longitudinally elongated key. Complementary sized slots are formed in the forward and/or rearward ends of the coupling jacket opening into the central bore so as to enable the location of the key at least partially therein. It is to be appreciated that the positioning of the key within both the slots in the coupling jacket and in the keyways of the motor shaft and/or pump shaft prevents slippage of the coupling jacket relative to the pump shaft and/or motor shaft radially about the axis as the motor is rotated. More preferably, the lifting ring may also include a slot which is sized to receive therein part of a key. The slot is formed in the lifting ring relative to the slot which extends into an adjacent portion of the coupling jacket to facilitate the desired alignment of the ring aperture with the threaded bore formed in the adjacent end of the coupling jacket.

Accordingly, in one aspect the present invention resides in combination a motor having a selectively rotatable axially extending motor shaft, a rotatable drive shaft and a coupling assembly for connecting said drive shaft in an axially aligned orientation to said motor shaft for rotation therewith, the coupling assembly including,
a coupling jacket extending axially from a forward end proximate to said motor to a rearward end distal therefrom, the jacket defining an axially located central bore, a first end of the central bore extending into the forward end of the coupling jacket and being sized to at least partially receive therein an endmost portion of the motor shaft, the second other end of the central bore extending into the rearward end of the coupling jacket and being sized to at least partially receive therein an endmost portion of the drive shaft, an internally threaded bore being spaced radially outwardly from said axis and extending in the axial direction into the rearward end of the jacket,
a lifting ring defining an open interior sized for circumferential placement about the drive shaft and being secured substantially against axially sliding movement relative thereto, the lifting ring including an aperture open in the axial direction, the aperture being located for positioning in substantial axial alignment with the internally threaded bore upon coupling of the lifting ring to the drive shaft, and
a threaded connector having a threaded end with a complementary thread configuration to said internally threaded bore, said connector being insertable axially through said aperture with said threaded end in threaded engagement with said threaded bore, whereby the turning of the threaded connector moves the lifting ring and drive shaft in the axially direction relative to the coupling jacket and motor shaft.

In another aspect, the present invention resides in a coupling assembly for connecting a drive shaft to a selectively rotatable motor shaft for rotation therewith, the coupling assembly including,
a split coupling sleeve being elongated in an axial direction from a forward end to a rearward end, the sleeve defining an axially located central bore, a first end of the central bore extending into the forward end of the coupling sleeve and being sized to at least partially receive therein an endmost portion of the motor shaft, the second other end of the central bore extending into the rearward end of the coupling sleeve and being sized to at least partially receive therein an endmost portion of the drive shaft,
a lifting ring defining an open interior sized for circumferential placement about the drive shaft and being secured substantially against axially sliding movement relative thereto, the lifting ring including an aperture open in the axial direction, and
a connector being insertable axially through said aperture into engagement with the rearward end of the coupling sleeve, whereby the engagement of the connector with the coupling sleeve moves the lifting ring and drive shaft in the axially direction relative to the coupling jacket and motor shaft.

In a further aspect the present invention resides in a coupling assembly for connecting a pump shaft in a vertically axially aligned orientation with a selectively rotatable motor shaft of a motor for rotation therewith, the coupling assembly including,
a coupling sleeve extending axially from a forward end proximate to said motor to a rearward end distal therefrom, the sleeve defining an axially located central bore, a first end of the central bore opening into the forward end of the coupling sleeve and being sized to at least partially receive therein an endmost portion of the motor shaft, the second other end of the central bore extending into the rearward end of the coupling sleeve and being sized to at least partially receive therein an endmost portion of the drive shaft, at least one internally threaded bore being spaced radially outwardly from said central bore and extending in the axial direction into the rearward end of the jacket,
a lifting ring defining an open interior sized for circumferential placement about the drive shaft and being secured substantially against axially sliding movement relative thereto, the lifting ring including at least one aperture open in the axial direction, and located for positioning in substantial axial alignment with associated internally threaded bores upon coupling of the lifting ring to the drive shaft, and
at least one threaded connector having a threaded end with a complementary thread configuration to said internally threaded bore, said connectors being insertable axially through a corresponding one of said apertures with said threaded end in threaded engagement with said associated threaded bore, whereby the turning of the threaded connectors moves the lifting ring and drive shaft in the axially direction relative to the coupling jacket and motor shaft.

BRIEF DESCRIPTION OF THE DRAWINGS

The following detailed description will be taken together with the accompanying drawings in which.

DETAILED DESCRIPTION OF THE PREFERRED EMBODIMENT

Figure 1:
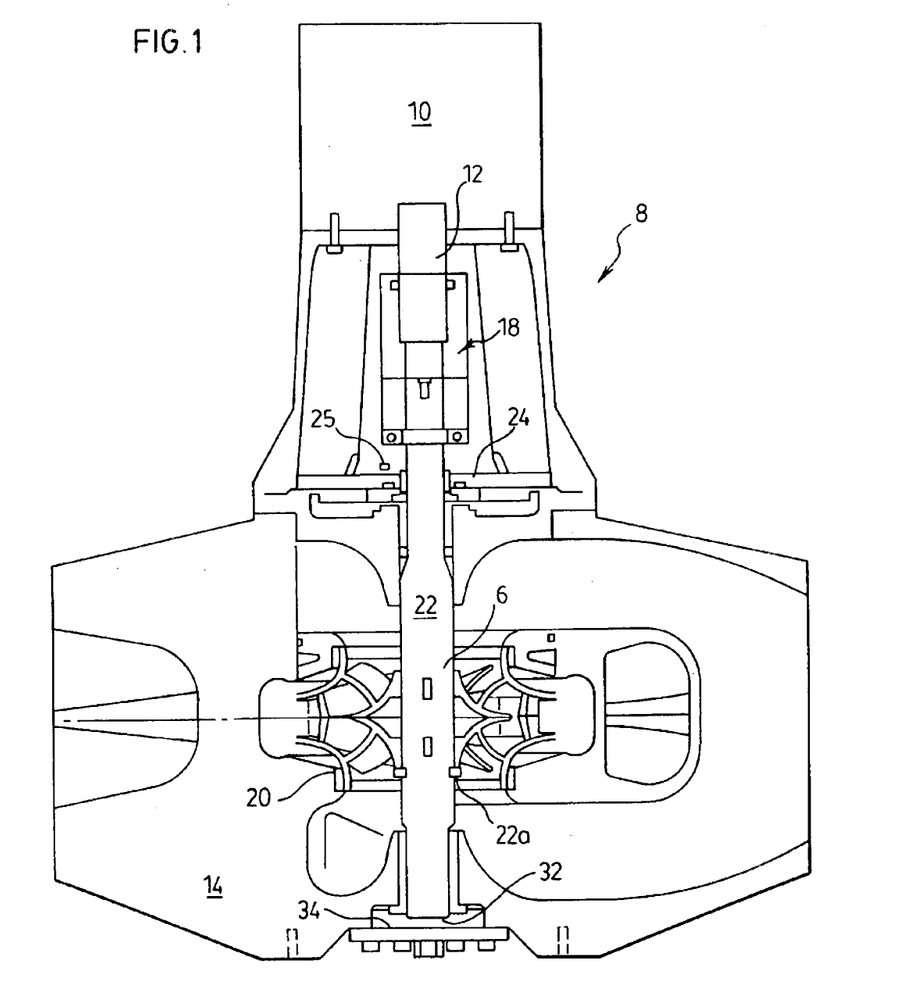
FIG. 1 illustrates schematically a cross-sectional view of a vertical in-line water pump incorporating a motor, an impeller assembly and a motor/pump shaft coupling assembly in accordance with a preferred embodiment of the invention.
Figure 2:
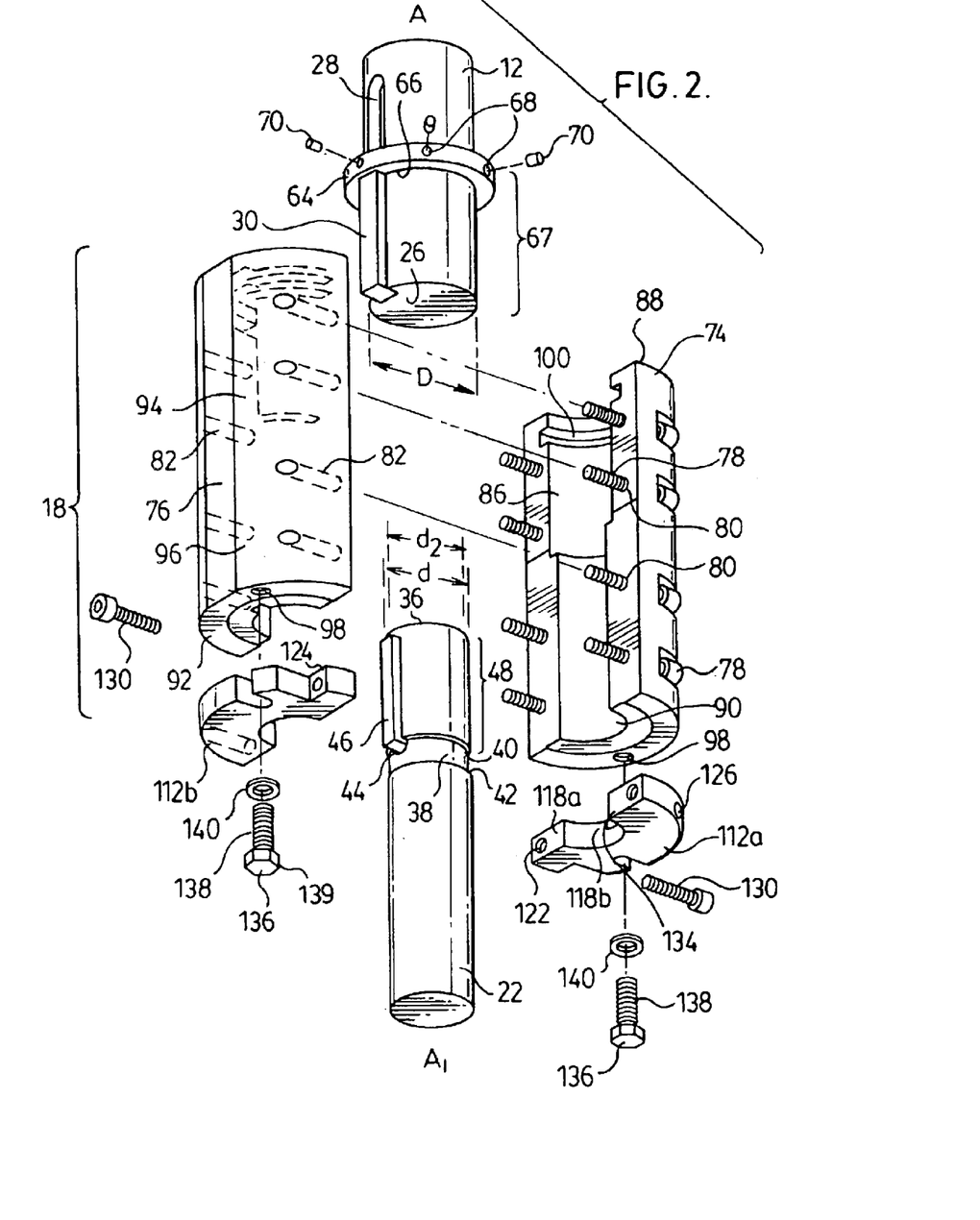
FIG. 2 illustrates a partial exploded view of the motor/pump shaft coupling assembly shown in FIG. 1.

Reference is first made to FIG. 1 which shows a vertical in-line water pump 8 in accordance with a preferred embodiment of the invention. The pump 8 includes an electric motor 10 having a selectively rotatable motor shaft 12, a pump housing 14, a rotatable impeller assembly 16, and a motor/pump shaft coupling assembly 18 used to couple the impeller assembly 16 to the motor shaft 12 for rotation therewith. The motor 10 is mounted to an upper portion of the pump housing 14 with the pump shaft 22 aligned with and rotatable about a vertical axis A-A$_1$ (FIG. 2). The impeller assembly 16 consists of an impeller 20 which is rotatably disposed within the housing 14 and secured to a lower end portion of the rotatable stainless steel cylindrical pump shaft 22a. The pump shaft 22 extends vertically through an upper opening 24 in the housing 14 in alignment with the axis A-A$_1$ and is coupled in axial alignment with the motor shaft 12 by the coupling assembly 18. A suitable rotary seal 25 is provided between the opening 24 and shaft 22.

FIG. 2 illustrates best a lowermost end portion of the motor shaft 12 as being generally cylindrical in shape and rotatable about the vertical axis A-A$_1$. The motor shaft 12 has a radial diameter D, and extends to a lowermost end 26. A keyway 28 extends axially along a radial edge portion of the shaft 12 opening into the end 26. An elongated steel key 30 is insertable partially into the keyway 28 and has a size selected so as to project radially outwardly therefrom.

The pump shaft 22 is also shown as being generally cylindrical and, in assembly of the pump 8, is secured in position axially aligned with the motor shaft 12 for rotation about the axis A-A$_1$. The pump shaft 22 extends from a lowermost end 32 (FIG. 1) which is immediately adjacent to the bottom interior 34 of the pump housing 14 to an upper end 36, which locates a distance spaced below the lower end 26 of the motor shaft 12. FIG. 2 shows best the end 36 of the pump shaft 22 as having a diameter d which may be of greater, equal or smaller size than the diameter D of the motor shaft 12 depending on the overall mass and applied forces of the impeller assembly 16. An annular groove 38 having a radial diameter d, which preferably is selected less than diameter d, is formed about the pump shaft 22 at a location spaced rearwardly from the shaft upper end 36 away from the motor 10. The reduced diameter of the groove 38 defines a pair of radially extending shoulders 40,42 which define respectively forward and rearward edges of the groove 38. The diameter of the shaft 22 between the groove 38 and end 36 may be equal, smaller or greater than the diameter d, depending upon the configuration of the impeller assembly 16.

As with the motor shaft 12, a keyway 44 extends longitudinally in the axial direction along a radial edge of the pump shaft 22. Preferably, the keyway 44 is formed in the pump shaft 22 so as to extend from the shaft end 36 rearwardly part-way into the reduced diameter groove 38. An elongated steel key 46 is positioned in the keyway 44. The key 46 is sized for fitted placement partially within the keyway 44 so as to project radially outwardly therefrom, and extend longitudinally across part, and preferably, the bulk of an endmost portion 48 of the pump shaft, and more preferably partially across part of the reduced diameter groove 38.

Figures 3, 4:
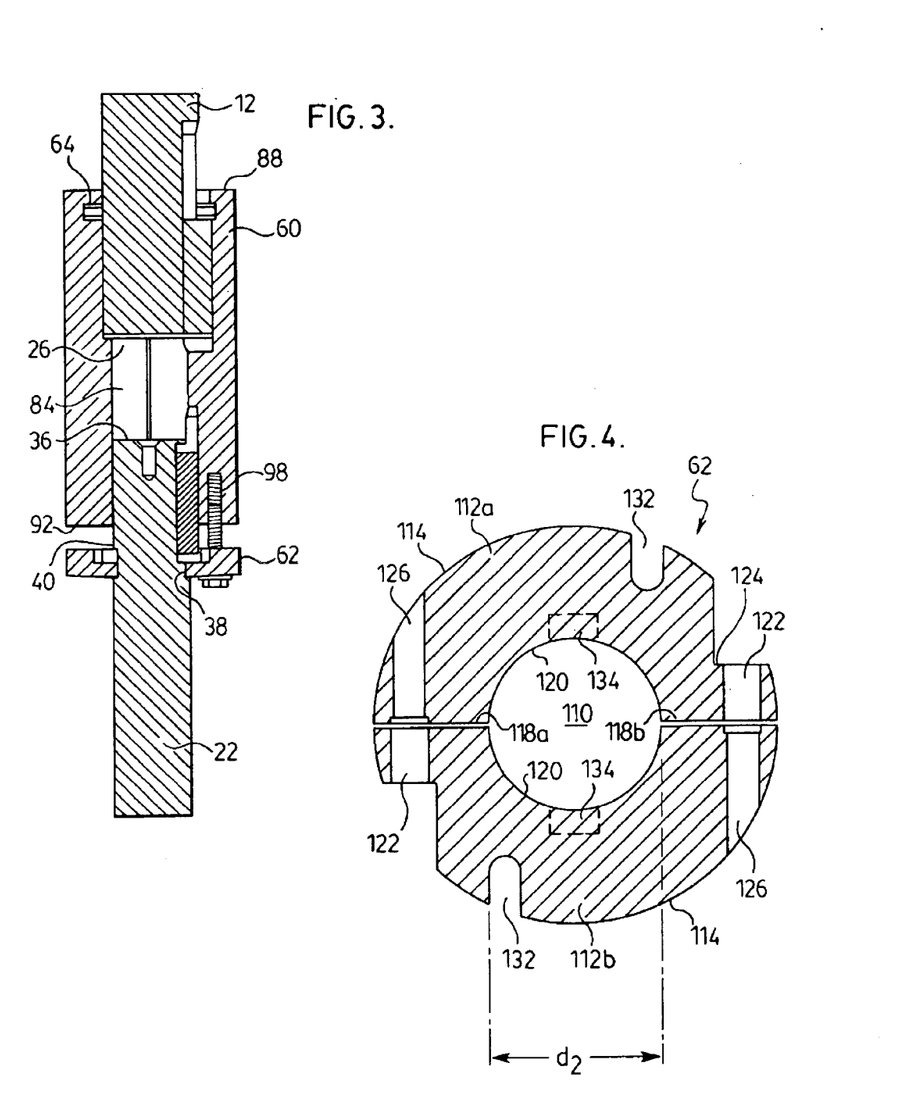
FIG. 3 shows a schematic cross-sectional view of the motor/pump shaft coupling assembly in accordance with the present invention secured to the motor shaft and pump shaft, and prior to final positioning of the pump shaft.
FIG. 4 illustrates an enlarged schematic end view of the lifting ring used in the motor/pump shaft coupling assembly shown in FIG. 2.

FIGS. 2 and 3 show best the coupling assembly 18 used to secure the pump shaft 22 to the motor shaft 12 for rotation therewith. The coupling assembly 18 includes a metal split coupling jacket or sleeve 60, a split jack ring 62, and a steel or metal locking ring or collar 64.

The locking collar 64 is formed having a central circular opening 66, which has a radial diameter which is selected marginally greater than the diameter D of the motor shaft 12, enabling the collar 64 to be slid axially over an insertable end 67 of the motor shaft 12. A series of internally threaded apertures 68 are provided radially about a periphery of the locking collar 64 and extend therethrough. The apertures 68 are sized to receive therein a respective hexagonal head screw 70 which, when fully tightened within a respective aperture 68 are brought into bearing contact with the periphery of the motor shaft 12 thereby securing the locking collar 64 to the shaft 12 in a friction fit. Optionally, the motor shaft 12 may also include one or more scribe marks or other visual indicia (not shown) to assist in alignment of the locking collar 64 thereon in a desired optimum position. FIG. 2 shows the motor shaft keyway 28 as extending axially from the shaft end 26 along the insertable end 67 and axially past the positioned locking collar 64. It is to be appreciated that by forming the keyway 28 with a greater length enables the locking collar 64 and key 30 to be secured to the motor shaft 12 in a variety of different positions which may be selected having regard to the degree of axial relative movement of the pump shaft 22 which may be required.

As shown best in FIG. 2, the coupling sleeve 60 is formed having a generally cylindrical profile as a split coupling which is divided about its longitudinal center into two semi-cylindrical halves 74,76. In assembly the halves 74,76 are secured to each other to complete the coupling sleeve 60 by the use of threaded cap screws 78. The cap screws 78 are provided at spaced locations and are insertable through bore holes 80 formed at longitudinally spaced locations through coupling half 74, and which are each positioned for alignment with a corresponding internally threaded socket 82 formed within the second other coupling half 76. The coupling sleeve 60 further defines a central bore 84 (FIG. 3) along its axial center. In the embodiment shown, the central bore 84 includes a first diameter portion 86 which extends inwardly into the forward end 88 of the coupling sleeve. The first diameter portion 86 has a radial diameter selected which is equal or marginally greater than the diameter D of the motor shaft 12. A smaller second diameter portion 90 of the bore extends inwardly from the rearward end 92 of the coupling sleeve 60. The second diameter portion 90 has a diameter equal or marginally greater than the diameter d of the shaft 22 so as to permit the insertion of the endmost portion 48 of the pump shaft 22 therein when the coupling half 76 is secured to the coupling half 74. An internally threaded bore 98 is formed extending axially into the rearward end 92 of each of the coupling halves 74,76. Most preferably, the threaded bores 98 are provided so as to orient radially opposite to each other on each side of the axis A-A$_1$ upon assembly of the pump 8.

As shown in phantom in FIG. 2, a longitudinally extending groove 94 opens into a radial edge of the first portion 86 of the bore 84. The groove 94 has a depth and size selected to permit insertion therein of the portion of the key 30 which projects radially outwardly beyond the keyway 28 formed in the motor shaft 12. As with the first end portion 86, the second end portion 90 also includes a longitudinally extending groove 96. The groove 96 has a radial depth and dimension selected to permit the insertion therein of the portion of the key 46 which projects radially beyond the keyway 44 formed in the endmost portion 48 of the pump shaft 22.

A enlarged diameter radially extending groove 100 is also formed about a peripheral edge of the sleeve 60 open into the bore 84 and adjacent to the forward end 88. The groove 100 has a dimension and depth selected to permit the location of the locking collar 64 therein when the sleeve halves 74,76 are joined to each other over the insertable end 67. It is to be appreciated that the coupling sleeve 60 is secured to the motor shaft 12 by securing the first sleeve half 74 to the second sleeve half 76 while ensuring that the locking collar 64 locates within the radial groove 100. In this manner, the fastening of the halves 74,76 of the coupling sleeve 60 together completes the coupling sleeve 60 about the collar 64 so as to substantially prevent or limit its axial sliding relative to the motor shaft 12.

FIGS. 2 and 4 show best the jack ring 62 used in the lifting of the impeller assembly 16 relative to the housing 14 and the coupling of the pump shaft 22 to the motor shaft 12 for rotation therewith. The jack ring 62 includes a pair of semi-circular ring segments 112a, 112b each having the identical construction. In this manner, the ring segments 112a, 112b may be used interchangeably and it is to be appreciated that the lifting ring 62 provides for a simplified construction with a reduced number of parts, as compared to conventional coupling devices. In lateral cross-section, each of the ring segments 112a, 112b includes a generally arcuate peripherally extending surface 114 which extends approximately 180°, a pair of aligned chordate surfaces 118a, 118b which merge with the surface 114 at radial outer edges and with an arcuate inner surface 120 at inward ends. As shown best in FIG. 2, the lifting ring 62 extends in the axial direction a distance less than, and most preferably marginally less than the axial width of the groove 38 formed in the pump shaft 22. Furthermore, as shown best in FIG. 4, when the ring segments 112a, 112b are joined together, the inner arcuate surfaces 120 of the segments 112a, 112b are brought into register so as to define a through aperture 110 which has a diameter d$_2$ which most preferably is selected equal or marginally greater than the diameter d$_1$ of the groove 38, but less than the diameter d of the remaining portion of the pump shaft 22.

As shown best in FIG. 4, each of the ring segments further includes a through bore 122 and an internally threaded bore 126. The through bore 122 which extends tangentially to the axis A-A$_1$ from a shoulder 124 formed in the outer radial surface 114 opening into and generally normal to the chordate surface 118a. The internally threaded bore 126 extends tangentially to the axis A-A$_1$ through and generally normal to the second other chordate surface 118b into, and most preferably through the radial surface 114 on a radially opposing portion of the semi-circular ring segment 112. As shown best in FIG. 4, the bore 122 and internally threaded bore 126 are thus positioned so that the bore 122 of the segment 112a axially aligns with the internal threaded bore 126 of the second semi-circular segment 112b; while the through bore 122 of the second semi-circular segment 112b is aligned with the internally threaded bore 126 of the first segment 112a. As shown in FIG. 2, externally threaded bolts 130 are thus inserted through the bores 122 so as to threadedly engage the opposing internal threaded bore 126 of the other segment 112 to complete the ring 62. Segments 112a,112b thus secure the lifting ring 62 about the groove 38 of the pump shaft 22 in the manner shown in FIG. 3. It is to be appreciated that when the ring segments 112a, 112b are so coupled, the jack ring 62 locates within the pump shaft groove 38 and is prevented from moving axially therefrom by its engagement with the groove shoulders 40,42.

FIGS. 2 and 4 furthermore show best each ring segment 112 as including a slot 132 extending axially therethrough radially inwardly from the peripheral radial surface 114. As shown in FIG. 2, the slots 132 are positioned so as to axially align with the threaded bores 98 formed within the rearward ends 92 of the split coupling sleeve halves 74,76. As shown in phantom in FIG. 2, a groove 134 is formed partially across the inner arcuate surface 120 of each of the ring segments 112a,112b. Preferably, the groove 134 extends in the axial direction approximately halfway to completely through the connecting ring segments 112a, 112b and is positioned such that the groove 134 of one of the segments 112a,112b aligns with the groove 96 when the slots 132 are provided in axial alignment with the corresponding threaded bore 98. Although the preferred embodiment of the invention illustrates the slot 132 as extending axially partway through the jack ring 110, the invention is not so limited. If desired, the slot 132 could extend completely through each ring segment 112 or alternately, be omitted in its entirety.

A pair of bolts 136, each having a threaded end 138 with an external thread configuration selected for threaded engagement within the internally threaded bores 98 are used to movably couple the jack ring 62 to the coupling sleeve 60 and raise the impeller assembly 16. The bolts 136 are formed with a bolt head 139 which has a radial diameter selected larger than the slot 132. Optionally, a washer 140 may be interposed between the bolt head 140 and slot 132 to better distribute load forces to the jack ring 62.

Although the formation of the coupling assembly 18 with a generally cylindrical profile is preferred in that it minimizes the rotating profile and space required for installation of the coupling assembly 18 within the pump 8, other profiles for the coupling sleeve 60 and/or jack ring 62 are possible, including without restriction, polygonal, rectangular or other shapes.

In assembly of the pump 8, the impeller assembly 16 is typically installed within the pump housing 14, with the pump shaft 22 resting directly on its bottom interior 34. The motor 10 is bolted on the housing 14 through the use of motor brackets so that the motor shaft 12 extends downwardly aligned with the axis A-A$_1$ and directly above the pump shaft 22.

To connect the pump shaft 22 in axial alignment with the motor shaft 12, the motor collar or locking ring 64 is first slid onto the motor shaft 12 to a location preselected, wherein upon assembly the impeller 20 and pump shaft 22 locate a desired distance from the bottom interior 34. Most preferably, the motor shaft 12 is pre-scribed using a coupling scribe mark which is provided on an internal portion of each coupling sleeve halves 74,76. The locking ring 64 is positioned having regard to the scribe mark so as to provide the optimum coupling gap between the motor shaft 12 and pump shaft 22, so that the impeller 22 are located above the bottom 34 of the pump housing 14. Following its positioning, the locking ring 64 is secured to the motor shaft 12 by inserting the set screws 70 through threaded apertures 68 about the ring 64 so as to frictionally engage the periphery of the shaft 12.

Following the positioning of the locking ring 64, the motor key 30 is inserted into the motor shaft keyway 28 and the pump key 46 is inserted into the pump shaft keyway 44, as for example in a friction fit.

The lifting or jack ring 62 is next coupled to the pump shaft 22 located within the shaft groove 38 by positioning the semi-circular ring segments 112a, 112b in the reduced diameter groove 38 with the pump key 46 located within the groove 134 formed in one segment 112a,112b. Connecting bolts 130 are then inserted through the respective bores 122 into engagement with the threaded bore 126 in the opposing ring segments 112,112b and tightened to mechanically secure the ring segments 112a, 112b to each other.

The split casing sleeve halves 74,76 are then loosely assembled over the end portion 67 of the motor shaft 12 so that the locking ring 64 locates within the radial groove 100 by partially tightening the cap screws 78. The lifting bolts 136 and washers 142 are then positioned laterally into each slot 132 and brought into engagement with a respective threaded bore 98 located within the rearward end 92 of the coupling sleeve halves 74,76. The bolts 136 are then sequentially tightened. It is to be appreciated that as the bolts 136 threadedly engage and run into the bores 98, the engagement of the bolt head 139 and washers 140 with the adjacent portions of the jack ring 62 draws the jack ring 62 forwardly and upward from an initial spaced position shown in FIG. 3 until the ring 62 moves into contact with the rearward end 92 of the coupling sleeve 60. As the jack ring 62 is drawn forwardly, its engagement with the shoulder 40 acts to raise both the pump shaft 22 and impeller assembly 16 to lift the impeller 20 to the desired height. Following positioning of the pump impeller assembly 16 at the desired height, all of the remaining cap screws 78 and bolts 130 are tightened to complete the assembly 18.

It is to be appreciated that the use of a radially extending and open slot 132 advantageously facilitates the insertion of the lifting bolts 136 into the threaded bores 98 in close proximity spaces. The invention is, however, not so limited, and other aperture configurations through the jack ring 62 as possibly, including without restriction, bores, holes, shoulders or the like. Similarly, although the preferred embodiment of the invention discloses the use of a locking collar or ring 64 as securing the split coupling sleeve 60 to the motor shaft 12, other possible connections to secure the coupling sleeve 60 and motor shaft 12 will now become apparent.

Figure 5:
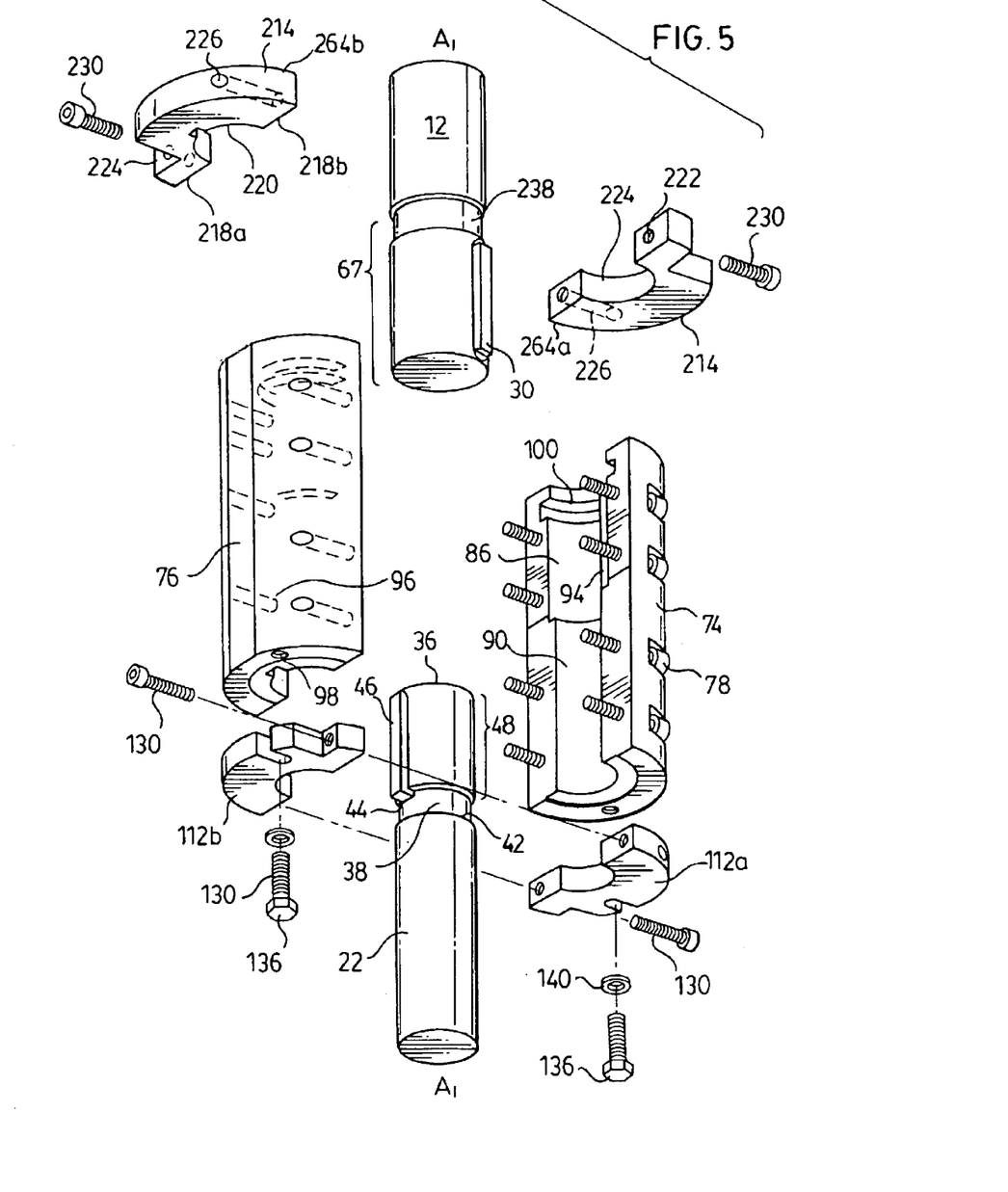
FIG. 5 illustrates a partial exploded view of a motor/pump shaft coupling assembly in accordance with a further embodiment of the invention.

Although FIGS. 2 and 3 illustrate the locking collar 64 as being secured to the motor shaft 12 by means of head screws 70, the invention is not so limited. It is to be appreciated that various other modes of securing a locking collar in place on the motor shaft 12 are also possible and will now become apparent. Reference may be had to FIG. 5 which shows an alternate locking collar configuration is shown wherein like reference numerals are used to identify like components.

Figure 6:
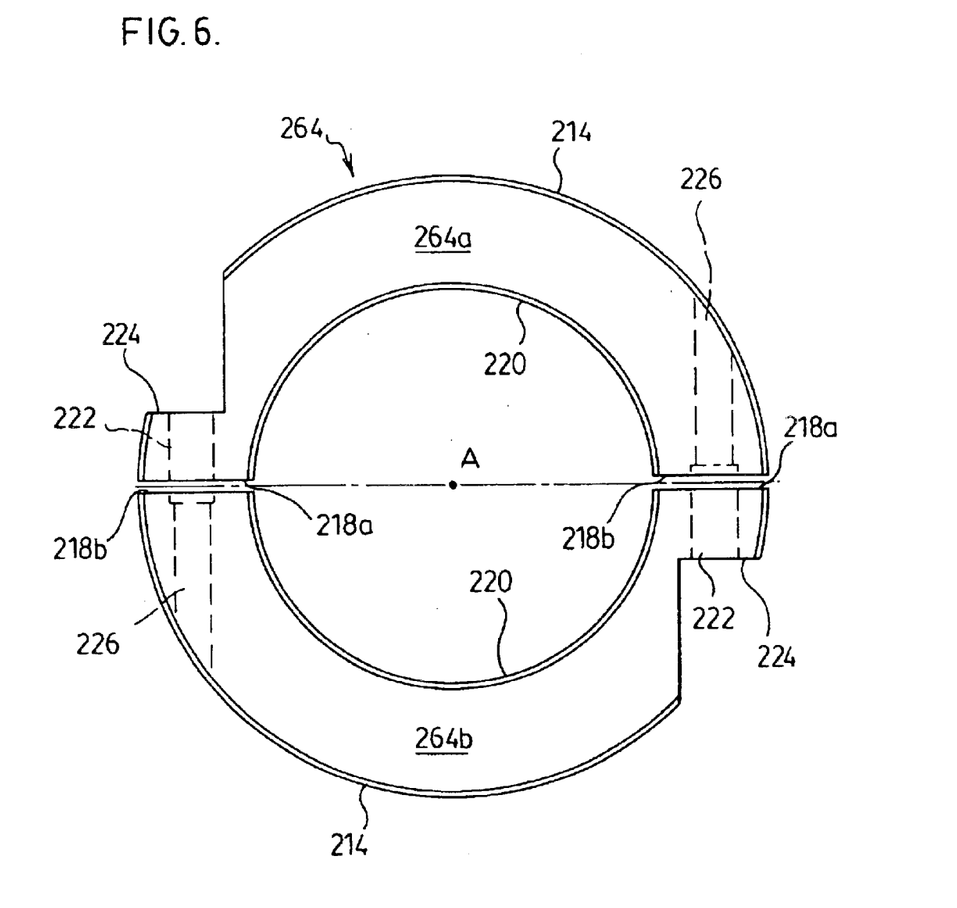
FIG. 6 illustrates schematically a locking collar construction for use in the coupling assembly of FIG. 5 in accordance with another embodiment of the invention.

In the embodiment shown in FIGS. 5 and 6, the locking collar 64 is formed as a split collar construction having two identical semi-circular collar halves 264a,264b.

The collar halves 264a,264b are generally C shaped and are sized for fitted placement within a forwardmost peripherally extending groove 238 formed in the motor shaft 12. The groove 238 extends inwardly about the circumference of the motor shaft 12 about part of the insertable end portioin 67. Like the ring segments 112a,112b, each of the collar halves 264a,264b includes a generally arcuate peripherally outwardmost surface 214 which extends approximately 180°, a pair of aligned chordate surfaces 218a,218b which merge with the surface 214 at radial outer edge portions, and with a concentric arcuate inner surface 220 at radially inner edge portions.

The collar halves 264a,264b further each include a through bore 222 and an internally threaded bore 226. The through bore 222 extends tangentially to an axis $A-A_1$ about which the inner surface 220 is centred, from a shoulder 224 formed in the outer radial surface 214 into the chordate surface 218a. The threaded bore 226 is formed in the other chordate surface 218b so as to align with the bore 222 of the other collar half 264 when the surfaces 218 of the collar halves 264a,264b are juxtaposed.

It is to be appreciated that the collar halves 264a,264b are sized so as to assume an orientation at least partially disposed within the groove 238 while projecting radially therefrom so as to locate at least partially within the radial groove 100 formed in the end of the coupling sleeve 60. As with the jack ring 64, the insertion of bolts 230 through a through bore 222 into an opposing internally threaded bore 226 of the second other collar half is used to secure the collar 264 within the groove 238 to prevent movement of the collar 264 axially along the motor shaft 12. It is to be appreciated that by forming the locking collar 264 as two split halves 264a,264b, the use of head screws 70 may be omitted in their entirety.

It is to be appreciated that in an alternate construction to that shown in FIG. 6, the collar halves 264a,264b could be adapted for coupling to each other by way of bolts or other fasteners. In an alternate construction, the split collar halves 264a,264b may be adapted for insertion partially within the groove 238 in a friction-fit and thereby held without the use of fasteners. As the collar 264 locates within the radial groove 100, as well as the peripherally extending groove 238, the attachment of the coupling sleeve halves 74,76 to each other maintains the locking collar 264 in the desired position on the motor shaft 12.

Although the detailed description describes the jack ring 62 as being secured to the pump shaft 22 and the locking ring 64 secured to the motor shaft 12 to vertically move the shaft 22, the invention is not so limited. It is to be appreciated that the coupling assembly 18 could be secured in position in the inverted arrangement from that shown in FIG. 2 with the motor shaft 12 having either a reduced diameter groove, or alternately, with an alternate type of retaining member being used to secure the jack ring 110 to the motor shaft 12 for either vertical or horizontal movement relative to a drive shaft 22.

Although the detailed description describes and illustrates various preferred embodiments, the invention is not so limited. Many modifications and variations will now occur to persons skilled in the art. For a definition of the invention, reference may be had to the appended claims.

I claim:

1. In combination a motor having a selectively rotatable axially extending motor shaft, a rotatable driven shaft and a coupling assembly for connecting said driven shaft in an axially aligned orientation to said motor shaft for rotation therewith, the coupling assembly including,
a coupling jacket extending axially from a forward end proximate to said motor to a rearward end distal therefrom, the jacket defining an axially located central bore, a first end of the central bore extending into the forward end of the coupling jacket and being sized to at least partially receive therein an endmost portion of the motor shaft, the second other end of the central bore extending into the rearward end of the coupling jacket and being sized to at least partially receive therein an endmost portion of the driven shaft, an internally threaded bore being spaced radially outwardly from said axis and extending in the axial direction into the rearward end of the jacket, a lifting ring defining an open interior sized for circumferential placement about the driven shaft and being secured substantially against axially sliding movement relative thereto, the lifting ring including an aperture open in the axial direction, the aperture being located for positioning in substantial axial alignment with the internally threaded bore upon coupling of the lifting ring to the driven shaft, and a threaded connector having a threaded end with a complementary thread configuration to said internally threaded bore, said connector being insertable axially through said aperture with said threaded end in threaded engagement with said threaded bore, whereby the turning of the threaded connector moves the lifting ring and driven shaft in the axial direction relative to the coupling jacket and motor shaft.

2. The combination as claimed in claim 1 wherein said driven shaft includes a reduced diameter portion adjacent to said endmost portion of the driven shaft, the reduced diameter portion defining an annular shoulder, the lifting ring being sized for placement about said reduced diameter portion wherein the engagement of said lifting ring with said shoulder substantially prevents axial sliding of the lifting ring therepast.

3. The combination as claimed in claim 2 wherein the driven shaft includes a keyway extending axially along at least part of the endmost portion and the reduced diameter portion, an axially elongated key disposed in said keyway, the second end of the central bore including a longitudinally extending first slot sized to receive a portion of said key therein, the open interior of the lifting ring further defines a second slot sized to receive therein a portion of the key whereby the engagement of the key at least partially within the first and second slots assists in aligning the aperture with the threaded bore.

4. The combination as claimed in claim 2 wherein said coupling sleeve includes a plurality of internally threaded bores extending into the rearward end at radially opposite locations, said lifting ring including a first generally semi-circular ring segment, said aperture being formed through said first ring segment, and a second generally semi-circular ring segment having substantially the identical construction as the first ring segment.

5. The combination as claimed in claim 4 wherein said aperture is formed as a slot extending inwardly from a peripheral edge of said lifting ring.

6. The combination as claimed in claim 2 wherein said first end of said central bore further includes a radially extending enlarged diameter groove adjacent said forward end, the coupling assembly further including a connector for securing the jacket substantially against axially sliding movement along the motor shaft, the connector including, an annular collar sized for fitted placement within the groove and configured for positioning about the endmost portion of the motor shaft and at least one fastener for coupling the collar to the endmost portion of the motor shaft.

7. The combination as claimed in claim 6 wherein said driven shaft comprises a pump impeller drive shaft.

8. The combination as claimed in claim 3 wherein each of said apertures comprises a slot extending axially through said lifting ring and being open to a radial edge of the ring to allow said corresponding threaded connector to be moved radially therein.

9. The combination as claimed in claim 3 wherein the coupling assembly further includes a connector for securing the coupling sleeve substantially against axially sliding movement along the motor shaft, the connector including, an annular collar sized for sliding movement over the endmost portion of the motor shaft and at least one threaded fastener insertable through said collar to engage a portion of the motor shaft, the coupling sleeve further including a radially extending groove spaced towards the forward end, the radially extending groove being open into the first end of the central bore and sized to receive therein the annular collar in a complementary fit.

10. A coupling assembly for connecting a driven shaft to a selectively rotatable motor shaft for rotation therewith, the coupling assembly including, a split coupling sleeve being elongated in an axial direction from a forward end to a rearward end, the sleeve defining an axially located central bore, a first end of the central bore extending into the forward end of the coupling sleeve and being sized to at least partially receive therein an endmost portion of the motor shaft, the second other end of the central bore extending into the rearward end of the coupling sleeve and being sized to at least partially receive therein an endmost portion of the driven shaft, a lifting ring defining an open interior sized for circumferential placement about the driven shaft and being secured substantially against axially sliding movement relative thereto, the lifting ring including an aperture open in the axial direction, and a connector being insertable axially through said aperture into engagement with the rearward end of the coupling sleeve, whereby the engagement of the connector with the coupling sleeve moves the lifting ring and driven shaft in the axial direction relative to the coupling jacket and motor shaft.

11. The coupling assembly as claimed in claim 10 wherein the coupling sleeve further includes an internally threaded bore spaced radially outwardly from said central bore and extending in the axial direction into the rearward end of the coupling sleeve, and the aperture being located for positioning in substantial axial alignment with the internally threaded bore upon coupling of the lifting ring to the driven shaft, wherein the connector comprises a bolt having a threaded end adapted for threaded engagement with said internally threaded bore whereby the turning of the threaded connector moves the lifting ring and driven shaft in the axial direction towards the rearward end of the sleeve.

12. The coupling assembly as claimed in claim 11 wherein the aperture comprises a slot open to a radial edge of the lifting ring.

13. The coupling assembly as claimed in claim 12 wherein said driven shaft includes a reduced diameter portion adjacent to said endmost portion of the drive shaft, the reduced diameter portion defining an annular shoulder, said lifting ring including a first generally semi-circular ring segment which includes said aperture, and a second generally semi-circular ring segment having substantially the identical construction as the first ring segment, each of said ring segments being adapted for coupling to the other and having a respective arcuate inner surface, which upon coupling the first and second ring segments align to define an aperture sized for placement about said reduced diameter portion wherein the engagement of said lifting ring with said shoulder substantially prevents axial sliding of the lifting ring therepast.

14. The coupling assembly as claimed in claim 13 wherein the coupling assembly further includes a connector for securing the coupling sleeve substantially against axially sliding movement along the motor shaft, the connector including, an annular collar sized for sliding movement over the endmost portion of the motor shaft and at least one threaded fastener insertable through said collar to engage a portion of the motor shaft, the coupling sleeve further including a radially extending groove spaced towards the forward end, the radially extending groove being open into the first end of the central bore and sized to receive therein the annular collar in a complementary fit.

15. The coupling assembly as claimed in claim 13 wherein the motor shaft includes a peripherally extending groove extending radially about said endmost portion, the coupling assembly further includes a connector for securing the coupling sleeve substantially against axially sliding movement along the motor shaft, the connector including, a split collar being sized for fitted placement at least partially in said peripherally extending groove so as to extend radially therefrom outwardly from said motor shaft, the coupling sleeve further including a radially extending groove spaced towards the forward end, the radially extending groove being open into the first end of the central bore and sized to receive therein a portion of the split collar which extends radially outwardly from the motor shaft in a complementary fit.

16. A coupling assembly for connecting a driven pump shaft in a vertically axially aligned orientation with a selectively rotatable motor shaft of a motor for rotation therewith, the coupling assembly including, a coupling sleeve extending axially from a forward end proximate to said motor to a rearward end distal therefrom, the sleeve defining an axially located central bore, a first end of the central bore opening into the forward end of the coupling sleeve and being sized to at least partially receive therein an endmost portion of the motor shaft, the second other end of the central bore extending into the rearward end of the coupling sleeve and being sized to at least partially receive therein an endmost portion of the pump shaft, at least one internally threaded bore being spaced radially outwardly from said central bore and extending in the axial direction into the rearward end of the jacket, a lifting ring defining an open interior sized for circumferential placement about the pump shaft and being secured substantially against axially sliding movement relative thereto, the lifting ring including at least one aperture open in the axial direction, and located for positioning in substantial axial alignment with associated internally threaded bores upon coupling of the lifting ring to the pump shaft, and at least one threaded connector having a threaded end with a complementary thread configuration to said internally threaded bore, said connectors being insertable axially through a corresponding one of said apertures with said threaded end in threaded engagement with said associated threaded bore, whereby the turning of the threaded connectors moves the lifting ring and pump shaft in the axial direction relative to the coupling jacket and motor shaft.

17. The coupling assembly as claimed in claim 16 wherein the coupling sleeve comprises an axially split coupling sleeve including a first semi-cylindrical sleeve half, a second semi-cylindrical sleeve half, and at least one mechanical fastener for securing the first sleeve half to the second sleeve half, and wherein one of said internally threaded bores extends axially in each of said first and second sleeve halves.

18. The coupling assembly as claimed in claim 17 wherein said pump shaft includes a reduced diameter portion adjacent to said endmost portion of the pump shaft, the reduced diameter portion defining an annular shoulder, said lifting ring including a first generally semi-circular ring segment which includes said aperture, and a second generally semi-circular ring segment having substantially the identical construction as the first ring segment, each of said ring segments being adapted for coupling to the other and having a respective arcuate inner surface, which upon coupling the first and second ring segments align to define an aperture sized for placement about said reduced diameter portion wherein the engagement of said lifting ring with said shoulder substantially prevents axial sliding of the lifting ring therepast.

19. The coupling assembly of claim 16 wherein each of said apertures comprises a slot extending axially through said lifting ring and being open to a radial edge of the ring to allow said corresponding threaded connector to be moved radially therein.

20. The coupling assembly of claim 19 wherein said pump shaft includes a keyway extending axially along at least part of the endmost portion and the reduced diameter portion, an axially elongated key disposed in said keyway, the second end of the central bore including a longitudinally extending first slot sized to receive a portion of said key therein, the open interior of the lifting ring further defines a second slot sized to receive therein a portion of the key whereby the engagement of the key at least partially within the first and second slots assists in the aperture in alignment with the threaded bore.

* * * * *